United States Patent
Loc et al.

(10) Patent No.: US 8,886,839 B1
(45) Date of Patent: *Nov. 11, 2014

(54) METHOD AND APPARATUS FOR ENABLING A NETWORK INTERFACE TO SUPPORT MULTIPLE NETWORKS

(71) Applicant: Marvell International Ltd., Hamilton (BM)

(72) Inventors: Peter Loc, Santa Clara, CA (US); Lawrence Tse, Fremont, CA (US); Heng-Jui Hsu, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 13/894,876

(22) Filed: May 15, 2013

Related U.S. Application Data (63) Continuation of application No. 13/584,341, filed on Aug. 13, 2012, now Pat. No. 8,447,887, which is a continuation of application No. 10/077,042, filed on Feb. 14, 2002, now Pat. No. 8,244,916.

(51) Int. Cl.
  *G06F 15/16* (2006.01)
  *H04L 12/751* (2013.01)

(52) U.S. Cl.
  CPC .................................... *H04L 45/02* (2013.01)
  USPC ........................... 709/250; 709/220; 709/224

(58) Field of Classification Search
  CPC ..................... H04L 61/6022; H04L 29/12839
  USPC .......................... 709/201, 217, 220, 224, 250
  See application file for complete search history.

(56) References Cited

U.S. PATENT DOCUMENTS

| | | | |
|---|---|---|---|
| 5,566,225 A | 10/1996 | Haas | |
| 5,572,528 A | 11/1996 | Shuen | |
| 5,953,507 A | 9/1999 | Cheung et al. | |
| 6,115,750 A | 9/2000 | Dillon et al. | |
| 6,134,678 A * | 10/2000 | Mahalingam et al. | 709/239 |
| 6,148,344 A | 11/2000 | Bi | |
| 6,253,334 B1 | 6/2001 | Amdahl et al. | |
| 6,259,418 B1 | 7/2001 | Jones et al. | |
| 6,393,487 B2 | 5/2002 | Boucher et al. | |
| 6,459,705 B1 | 10/2002 | Cheng | |
| 6,701,406 B1 | 3/2004 | Chang et al. | |
| 6,732,186 B1 | 5/2004 | Hebert | |
| 6,810,520 B2 | 10/2004 | Lu et al. | |

(Continued)

FOREIGN PATENT DOCUMENTS

| | | |
|---|---|---|
| EP | 0939519 A1 | 9/1999 |
| EP | 1039363 A1 | 9/2000 |
| EP | 1039695 A1 | 9/2000 |

*Primary Examiner* — Phuoc Nguyen (57) ABSTRACT

A network interface includes a network interface controller and a plurality of communication paths between a host and a plurality of different networks. Each of the plurality of communication paths includes a media access controller and a physical layer device. The media access controller is configured to use a same media access controller address for communicating with a respective one of the plurality of different networks. The physical layer device configured to determine at least one of an availability of the respective one of the plurality of different networks and a performance condition of the respective one of the plurality of different networks. The network interface controller is configured to receive, from the host, a selection of one of the plurality of different networks and activate one of the plurality of communications paths based on the selection.

16 Claims, 4 Drawing Sheets

(56) References Cited

U.S. PATENT DOCUMENTS

| | | |
|---|---|---|
| 6,874,147 B1 | 3/2005 | Diamant |
| 7,227,838 B1 * | 6/2007 | O'Riordan ................ 709/224 |
| 7,237,036 B2 | 6/2007 | Boucher et al. |
| 7,693,048 B1 * | 4/2010 | O'Riordan ................ 709/224 |
| 2001/0027496 A1 | 10/2001 | Boucher et al. |
| 2002/0029288 A1 | 3/2002 | Dobbins et al. |
| 2002/0078249 A1 | 6/2002 | Lu et al. |
| 2002/0087710 A1 | 7/2002 | Aiken et al. |
| 2002/0156927 A1 | 10/2002 | Boucher et al. |
| 2003/0103521 A1 | 6/2003 | Raphaeli et al. |
| 2005/0160139 A1 | 7/2005 | Boucher et al. |

* cited by examiner

METHOD AND APPARATUS FOR ENABLING A NETWORK INTERFACE TO SUPPORT MULTIPLE NETWORKS

CROSS-REFERENCE TO RELATED APPLICATIONS

This application is a continuation of U.S. patent application Ser. No. 13/584,341 (now U.S. Pat. No. 8,447,887), filed Aug. 13, 2012, which is a continuation of U.S. patent application Ser. No. 10/077,042 (now U.S. Pat. No. 8,244,916), filed on Feb. 14, 2002. The disclosures of the above applications are incorporated herein by reference in their entirety.

BACKGROUND

The present invention relates generally to data communications, and particularly to enabling a network interface to support multiple networks.

The rapid proliferation of networks is making multiple networks available to computer users. For example, a user of a portable computer in a corporate workplace may have access to a wired network and to a wireless network. The user will normally connect his computer to the wired network because wired networks offer higher data transfer speeds and better reliability than wireless networks. However, the user may occasionally connect his laptop computer to the wireless network to take advantage of its portability, for example, to remain connected to the corporate internet to check for incoming electronic mail messages during a long meeting where no wired network access is available. Unfortunately, conventional network interfaces make changing networks very inconvenient.

Figure 1:
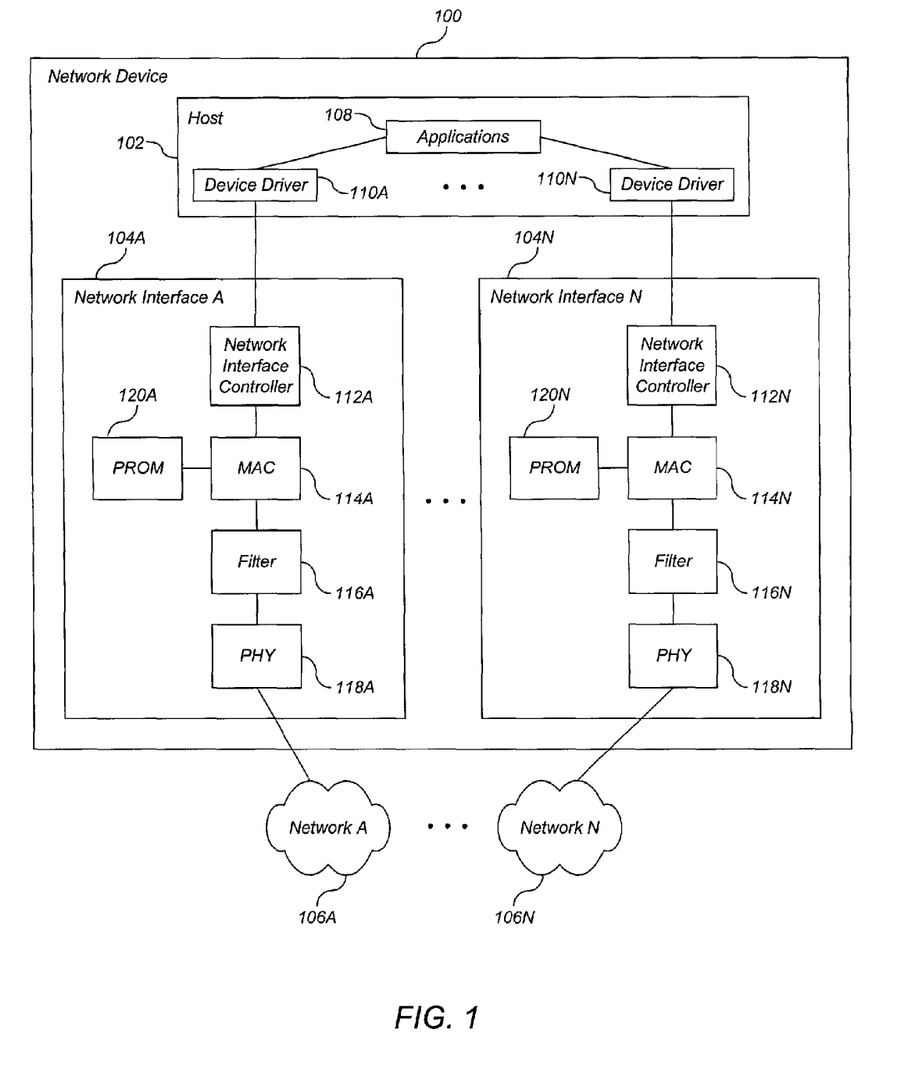
FIG. 1 is a functional block diagram of a network device including a host such as a laptop computer, a plurality of conventional network interfaces, and a plurality of networks.

FIG. 1 is a functional block diagram of a network device 100 including a host 102 such as a laptop computer, a plurality of conventional network interfaces 104A through 104N, and a plurality of networks 106A through 106N. Host 102 includes one or more software applications 108 and a plurality of device drivers 110A through 110N. Applications 108 communicate over one of networks 106 using a device driver 110 and a network interface 104 such as a network interface card. An application is a high-level computer program, such as a Web browser. A device driver is a low-level computer program that allows an application to communicate with a device, such as a printer or network interface card.

Each network interface 104 includes a network interface controller 112, a media access controller (MAC) 114, a filter 116, a physical layer device (PHY) 118, and a programmable read-only-memory (PROM) 120. A different MAC address is permanently assigned to each network interface during manufacture by programming a MAC address into PROM 120.

Consider network interface 104A. When network interface 104A is powered, network interface controller 112A retrieves the MAC address from PROM 120A, and loads the MAC address into MAC 114A. MAC 114A uses this MAC address for sending data from host 102 to network 106A by inserting the MAC address into the header of each frame of the data. Network interface 104A uses filter 116A to examine the header of each frame of data on the network, and transfers those frames having the MAC address of the network interface 104A to the host 102. Network interface 104N operates in the same way, but with a different MAC address. Further, the PHY 118 of a network interface 104 is specifically designed to be used with one type of network. Thus a network interface 104 for a wired network will not work with a wireless network. Thus to be able to communicate with multiple networks, a computer must include a conventional network interface for each network.

In conventional designs, each network 106 has a separate device driver 110, which is loaded by the operating system of host 102 when the operating system is started. When a user wants to change to a different network 106, the user must select the new network, and then restart (that is, "reboot") the operating system so the operating system can load the device driver 110 for the new network. This reboot process can take several minutes. In addition, rebooting the operating system requires that all of the active applications 108 first be closed. Thus in order to change networks and resume working at the same point, a user must save the data for all open applications, close all of the open applications, reboot the operating system, launch the applications that were closed, and load the data that was saved for each application. Clearly, this is a frustrating and time-consuming process.

SUMMARY

In general, in one aspect, the invention features an apparatus capable of communicating data with a second apparatus using one of multiple networks comprising first and second networks. The apparatus comprises a host specifying a preferred one of the multiple networks; a first physical layer device arranged to communicate the data over the first network, wherein the first physical layer device determines a first status of the first network; a second physical layer device arranged to communicate the data over the second network; a first media access controller to facilitate communication of the data from the host over the first network using a single media access controller address via the first physical layer device; and a second media access controller to facilitate communication of the data from the host over the second network using the single media access controller address via the second physical layer device; and a controller in communication with the first and second physical layer devices and the host to provide the first and second status to the host, wherein the host controls the controller to communicate the data using the first media access controller if the first network is the preferred one and the first status is available.

Particular implementations can include one or more of the following features. The second physical layer device determines a second status of the second network; and the host controls the controller to communicate the data using the second media access controller if the first network is the preferred one and the first status is unavailable, and the second status is available. The host comprises one of a computer, printer, personal digital assistant, compact flash interface device, and network appliance. The first network is a wired network; and the second network is a wireless network.

In general, in one aspect, the invention features an apparatus capable of communicating data with a second apparatus using one of multiple networks. It comprises a host specifying a preference among the multiple networks; a plurality of physical layer devices each arranged to communicate the data over one of the multiple networks, and to determine a condition of the one of the multiple networks; a plurality of media access controllers each arranged to facilitate communication of the data from the host over one of the multiple networks via one of the physical layer devices, wherein all of the media access controllers use a single media access controller address; and a controller in communication with the plurality of physical layer devices and the host to provide the condition of the multiple networks to the host, wherein the host selects one of the media access controllers based on the preference among the multiple networks and the condition of the multiple networks, and controls the controller to communicate the data using the selected media access controller.

Particular implementations can include one or more of the following features. The host comprises one of a computer, printer, personal digital assistant, compact flash interface device, and network appliance. The condition of the multiple networks comprises at least one of link status, network throughput, network traffic load, network congestion, and received signal intensity.

In general, in one aspect, the invention features a network interface. It comprises a first physical layer device arranged to communicate data over a first network, wherein the first physical layer device determines a first status of the first network; a second physical layer device arranged to communicate the data over a second network; a first media access controller to facilitate communication of the data from a host over the first network using a single media access controller address via the first physical layer device; and a second media access controller to facilitate communication of the data from the host over the second network using the single media access controller address via the second physical layer device; and a controller in communication with the first and second physical layer devices and the host to provide the first and second status to the host, wherein the host controls the controller to communicate the data using the first media access controller if the first network is a preferred one and the first status is available.

Particular implementations can include one or more of the following features. The second physical layer device determines a second status of the second network; and the host controls the controller to communicate the data using the second media access controller if the first network is the preferred one and the first status is unavailable; and the second status is available. The host comprises one of a computer, printer, personal digital assistant, compact flash interface device, and network appliance. The first network is a wired network; and the second network is a wireless network.

In general, in one aspect, the invention features a network interface. It comprises first physical layer device means for communicating data over a first network, wherein the first physical layer device determines a first status of the first network; second physical layer device means for communicating the data over a second network; first media access controller means for facilitating communication of the data from a host over the first network using a single media access controller address via the first physical layer device means; second media access controller means for facilitating communication of the data from the host over the second network using the single media access controller address via the second physical layer device means; and controller means in communication with the first and second physical layer device means and the host to provide the first and second status to the host, wherein the host controls the controller means to communicate the data using the first media access controller means if the first network is a preferred one and the first status is available.

Particular implementations can include one or more of the following features. The second physical layer device determines a second status of the second network; and the host controls the controller means to communicate the data using the second media access controller means if the first network is the preferred one and the first status is unavailable; and the second status is available. The host comprises one of a computer, printer, personal digital assistant, compact flash interface device, and network appliance. The first network is a wired network; and the second network is a wireless network.

In general, in one aspect, the invention features a method, apparatus and computer-readable media for communicating data from a first network device to a second network device using one of multiple networks comprising first and second networks, It comprises determining a first status of the first network; determining a second status of the second network; determining a preferred one of the first and second networks; communicating the data to the second network device using a single media access controller address over the first network if the first network is the preferred one and the status of the first network is available; and communicating the data to the second network device using the single media access controller address over the second network if the first network is the preferred one and the status of the first network is unavailable and the status of the second network is available.

Particular implementations can include one or more of the following features. The host comprises one of a computer, printer, personal digital assistant, compact flash interface device, and network appliance. the first network is a wired network; and the second network is a wireless network.

In general, in one aspect, the invention features a network interface. It comprises a plurality of physical layer devices each arranged to communicate data over one of multiple networks, and to determine a condition of the one of the multiple networks; a plurality of media access controllers each arranged to facilitate communication of the data from the host over one of the multiple networks via one of the physical layer devices, wherein all of the media access controllers use a single media access controller address; and a controller in communication with the plurality of physical layer devices and the host to provide the condition of the multiple networks to the host, wherein the host selects one of the media access controllers based on the preference among the multiple networks and the condition of the multiple networks, and controls the controller to communicate the data using the selected media access controller.

Particular implementations can include one or more of the following features. The host comprises one of a computer, printer, personal digital assistant, compact flash interface device, and network appliance. The condition of the multiple networks comprises at least one of link status, network throughput, network traffic load, network congestion, and received signal intensity.

In general, in one aspect, the invention features a method and computer-readable media for enabling a host to communicate data with a network device using one of multiple networks comprising first and second networks. It comprises receiving an indication of a preferred one of the multiple networks; receiving, from a first network interface arranged to communicate the data over the first network using a single media access controller address and to determine a first status of the first network, the first status; receiving, from a second network interface arranged to communicate the data over the second network using the single media access controller address and to determine a second status of the second network, the second status; controlling the first network interface to communicate the data over the first network if the first network is the preferred one and the first status is available.

Particular implementations can include one or more of the following features. Implementations comprise controlling the second network interface to communicate the data over the second network if the first network is the preferred one and the first status is unavailable, and the second status is available. The host comprises one of a computer, printer, personal digital assistant, compact flash interface device, and network appliance. The first network is a wired network; and the second network is a wireless network.

In general, in one aspect, the invention features a method and computer-readable media for enabling a host to communicate data with a network device using one of multiple networks. It comprises receiving a preference among the multiple networks; receiving, from a plurality of network interfaces each arranged to communicate the data over one of the multiple networks, and to determine a condition of the one of the multiple networks, a condition of each of the multiple networks, wherein all of the network interfaces use a single media access controller address; selecting one of the plurality of network interfaces based on the preference among the multiple networks and the condition of the multiple networks; and controlling the selected one of the plurality of network interfaces to communicate the data.

Particular implementations can include one or more of the following features. The host comprises one of a computer, printer, personal digital assistant, compact flash interface device, and network appliance. The condition of the multiple networks comprises at least one of link status, network throughput, network traffic load, network congestion, and received signal intensity.

Advantages that can be seen in implementations of the invention include one or more of the following. Implementations of the invention allow a host to communicate with multiple networks using a single MAC address, thereby conserving MAC addresses and reducing cost incurred through purchasing MAC addresses. Implementations of the invention allow a host to connect to multiple networks using a single network interface card, thereby conserving PC card slots and the costs of purchasing multiple network interface cards. Implementations of the invention allow a host to connect to multiple networks using a single device driver, thereby allowing the host to switch between networks without rebooting its operating system.

The details of one or more implementations are set forth in the accompanying drawings and the description below. Other features will be apparent from the description and drawings, and from the claims.

The leading digit(s) of each reference numeral used in this specification indicates the number of the drawing in which the reference numeral first appears.

DESCRIPTION

Figure 2:
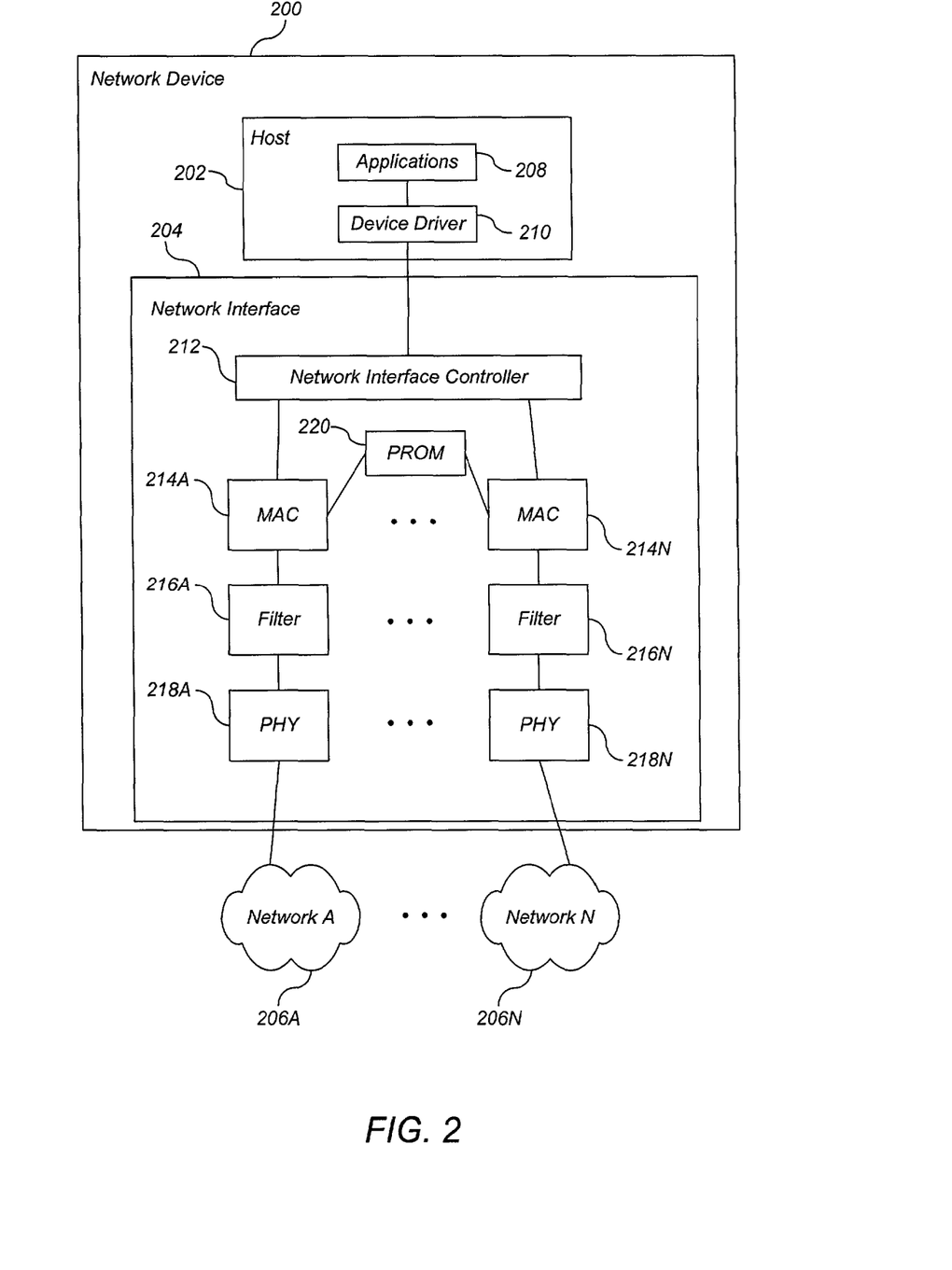
FIG. 2 is a functional block diagram of a network device including a host, a network interface, and a plurality of networks, according to one implementation.

FIG. 2 is a functional block diagram of a network device 200 including a host 202, a network interface 204, and a plurality of networks 206A through 206N, according to one implementation. Host 202 can be a computer, printer, personal digital assistant (PDA), compact flash interface device, network appliance, or any other device capable of communicating with a network using a network interface 204. Host 202 includes a plurality of software applications 208 and a single device driver 210. Applications 208 communicate over one of networks 206 using a device driver 210 and a network interface 204.

Network interface 204 includes a network interface controller 212, a plurality of media access controllers (MAC) 214A through 214N, filters 216A through 216N, a plurality of physical layer devices (PHY) 218A through 218N, and a programmable read-only-memory (PROM) 220. A different MAC address is permanently assigned to each network interface 204 during manufacture by programming a MAC address into PROM 220. As is clear from FIG. 2, network interface 204 includes multiple PHYs 218, each capable of communicating over a different network 206. Each PHY 218 also communicates with a MAC 114.

In network interface 204, all of the MACs 214 use the same single MAC address. When network interface 204 is powered, network interface controller 212 retrieves the single MAC address from PROM 220, and loads the single MAC address into all of the MACs 214A through 214N. Each MAC 214 uses this single MAC address for sending data from host 202 to one of the networks 206, and for sending data from one of the networks 206 to host 202.

Figure 3:
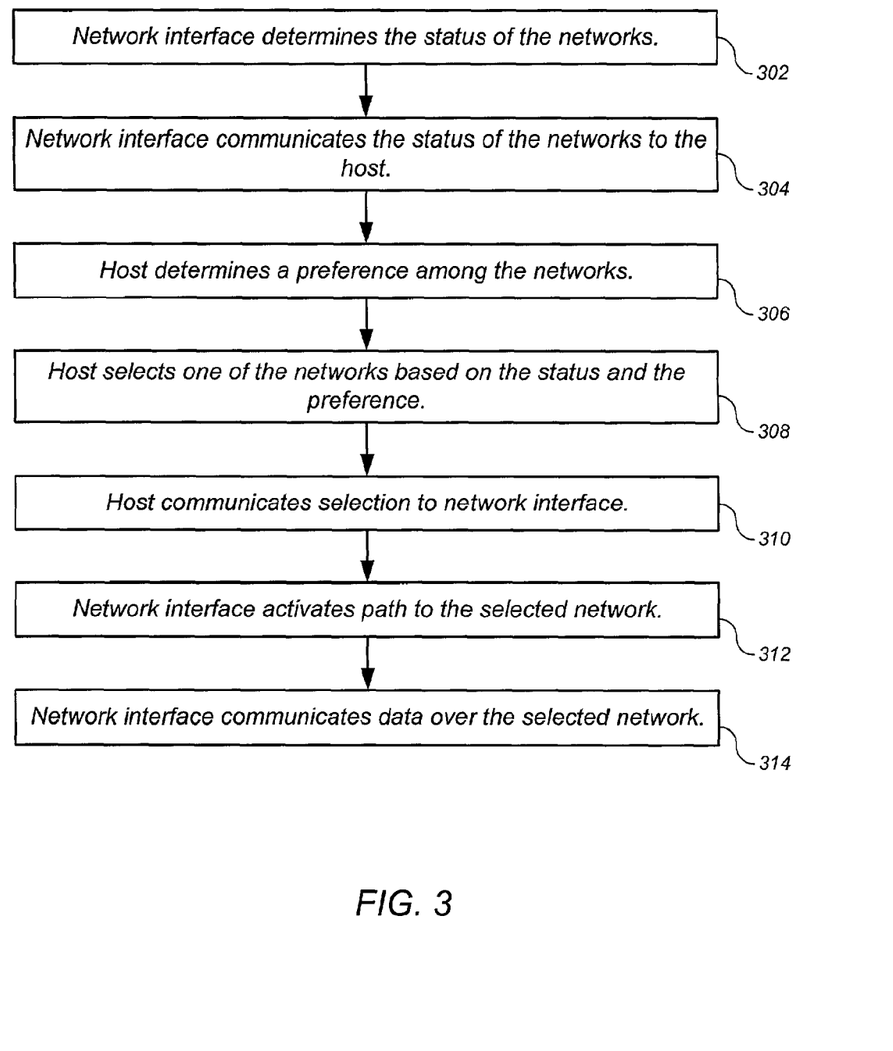
FIG. 3 is a flowchart depicting an operation of the network device of FIG. 2 according to one implementation.

FIG. 3 is a flowchart depicting an operation of network device 200 according to one implementation. When network interface 204 is powered, each of its PHYs 218 determines the status of the network 206 to which it is connected (step 302). PHY 218 determines a status of available when a link has been established over its network 206 with another network device, such as a switch or the like, and determines a status of unavailable when no such link has been established. In a wireless network, PHY 218 determines that a link has been established when the PHY detects the presence of a beacon signal emitted by a base station or another network device within the wireless network, as is well-known in the relevant arts.

Each PHY 218 communicates the status of its network 206 to network interface controller 212. Network interface controller 212 communicates the status of each network 206 to host 202 (step 304).

Host 202 determines a preference among the networks 206 (step 306). More specifically, device driver 210 within host 202 determines a preference among the networks 206. In one implementation, device driver 210 obtains the preference by prompting the user to select one of the networks 206. In another implementation, device driver 210 obtains the preference from a default setting or a setting previously established by a user. The preference can indicate one preferred network, or can indicate any number of preferred networks, in order of preference. In one implementation, a wired network is preferred over a wireless network by default.

Host 202 selects one of the networks 206 (step 308). More specifically, device driver 210 within host 202 selects one of the networks 206. In one implementation, device driver 210 selects one of the networks 206 based on the preference and the status of the networks. Device driver 210 selects the network 206 indicated by the preference if the status of that network is available. But if the status of that network 206 is unavailable, device driver 210 attempts to select another of the networks. If multiple preferred networks 206 are specified in order of preference, device driver 210 checks each in order of preference, and selects the most preferred network having an available status. If none of the preferred networks have an available status, device driver 210 attempts to select a network 206 that is not preferred, if any.

Host 202 communicates the selection to network interface 204 (step 310). Network interface controller 212 receives the selection, and activates the path within the network interface 204 that serves the selected network 206 (step 312). The selected path includes the PHY 218 that is connected to the selected network 206 and the MAC 214 that communicates with that PHY.

Network interface controller 212 activates a path within network interface 204 according to the following method. Network interface controller 212 includes a control register that includes a bit for each MAC 214. Each bit in the control register controls the corresponding MAC 214 to one of two states: active or standby. Network interface controller 212 activates a path by setting the bit for the MAC 214 in that path to control that MAC to the active state. Each MAC 214 controls the state of the PHY 218 in its path. When a MAC 214 is in the active state, it controls the PHY 218 in its path to the active state. When a MAC 214 is in the standby state, it controls the PHY 218 in its path to the standby state. When a MAC 214 and PHY 218 are in the active state, they communicate with the network connected to the PHY. When a MAC 214 and PHY 218 are in the standby state, they do not communicate with the network connected to the PHY.

The network interface 204 then communicates data to and from host 202 over the selected network 206 using the single MAC address loaded into all of the MACs 214 from PROM 220 (step 314). Network interface 204 sends data to the selected network 206 by inserting the MAC address into the header of each frame of the data. Network interface 204 uses filter 216 to examine the header of each frame of data on the selected network, and transfers those frames having the single MAC address of the network interface 204 to the host 202.

Different media can have different frame structures. In particular, the location of the destination address within the frame can differ for different media. Each filter 216 includes a filter table that tells the corresponding PHY 218 where to find the destination address in the frame for the medium that constitutes the network connected to that PHY. In particular, the filter table usually specifies the offset in bits of the destination address from the start of the frame. In other implementations, filters 216 are implemented together as a single filter having a filter table containing the offsets for each type of media supported by the network interface 204.

Figure 4:
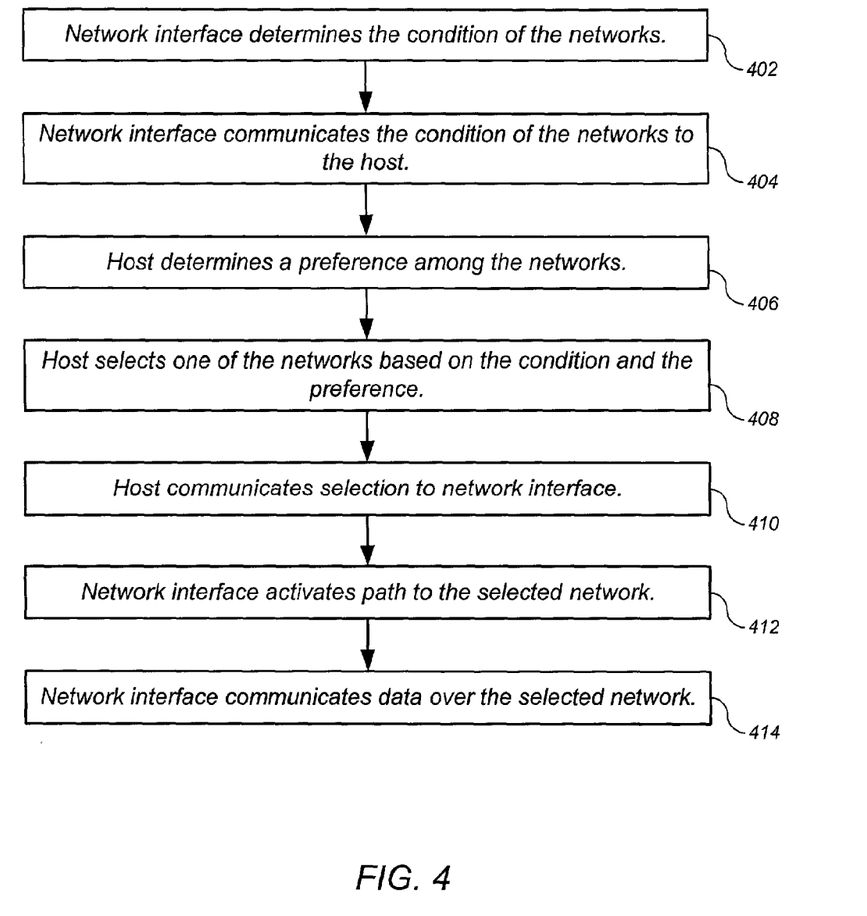
FIG. 4 is a flowchart depicting an operation of the network device of FIG. 2 according to another implementation.

FIG. 4 is a flowchart depicting an operation of network device 200 according to another implementation. When network interface 204 is powered, each of its PHYs 218 determines the condition of the network 206 to which it is connected (step 402). The condition of the network can include one or more measurements, including link status, network throughput, network traffic load, network congestion, received signal intensity, and the like.

Link status is a binary value that indicates the presence or absence of the network. In a wireless network, PHY 218 determines that a link has been established when the PHY detects the presence of a beacon signal emitted by a base station within the wireless network, as is well-known in the relevant arts.

Network throughput indicates the amount of data traversing the network interface 204. In one implementation, network interface 204 determines network throughput by determining the number of bits that traverse the network interface in a predetermined period of time.

Network traffic load indicates the total amount of traffic traversing the network. In one implementation, network interface 204 determines network traffic load by counting the total number of frames it receives from the network, including frames destined for other network interfaces and devices.

Network congestion indicates the level of excess traffic on the network. In one implementation, network interface 204 determines network congestion by computing the ratio of unsuccessful transmissions to total transmission attempts.

Received signal intensity indicates the strength of the signal received from a base station in a wireless network. When multiple wireless networks are present, received signal intensity is used to select among them.

In a wireless network, a network interface 204 often cannot receive signals from all of the other network devices communicating with the wireless network's base station. In one implementation, the wireless base station determines the condition of the network, and broadcasts this condition. Network interface 204 thus receives the network condition from the wireless base station.

Each PHY 218 communicates the condition of its network 206 to network interface controller 212. Network interface controller 212 communicates the condition of each network 206 to host 202 (step 404).

Host 202 determines a preference among the networks 206 (step 406). More specifically, device driver 210 within host 202 determines a preference among the networks 206. In one implementation, device driver 210 obtains the preference by prompting the user to select one of the networks 206. In another implementation, device driver 210 obtains the preference from a default setting or a setting previously established by a user. The preference can indicate one preferred network, or can indicate any number of preferred networks, in order of preference. In one implementation, a wired network is preferred over a wireless network by default.

Host 202 selects one of the networks 206 (step 408). More specifically, device driver 210 within host 202 selects one of the networks 206. In one implementation, device driver 210 selects one of the networks 206 based on the preference and the condition of the networks. When multiple measurements are available for each network, device driver 210 applies weighting techniques to the measurements.

Host 202 communicates the selection to network interface 204 (step 410). Network interface controller 212 receives the selection, and activates the path within the network interface 204 that serves the selected network 206 (step 412). The selected path includes the PHY 218 that is connected to the selected network 206 and the MAC 214 that communicates with that PHY.

Network interface controller 212 activates a path within network interface 204 according to the following method. Network interface controller 212 includes a control register that includes a bit for each MAC 214. Each bit in the control register controls the corresponding MAC 214 to one of two states: active or standby. Network interface controller 212 activates a path by setting the bit for the MAC 214 in that path to control that MAC to the active state. Each MAC 214 controls the state of the PHY 218 in its path. When a MAC 214 is in the active state, it controls the PHY 218 in its path to the active state. When a MAC 214 is in the standby state, it controls the PHY 218 in its path to the standby state. When a MAC 214 and PHY 218 are in the active state, they communicate with the network connected to the PHY. When a MAC 214 and PHY 218 are in the standby state, they do not communicate with the network connected to the PHY.

The network interface 204 then communicates data to and from host 202 over the selected network 206 using the single MAC address loaded into all of the MACs 214 from PROM 220 (step 414). Network interface 204 sends data to the selected network 206 by inserting the MAC address into the header of each frame of the data. Network interface 204 uses filter 216 to examine the header of each frame of data on the selected network, and transfers those frames having the single MAC address of the network interface 204 to the host 202.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the spirit and scope of the invention. Accordingly, other implementations are within the scope of the following claims.

What is claimed is:

1. A network interface, comprising:
   a plurality of communication paths between a host and a plurality of different networks, each of the plurality of communication paths including
      a media access controller configured to use a same media access controller address for communicating with a respective one of the plurality of different networks, and
      a physical layer device configured to determine at least one of i) an availability of the respective one of the plurality of different networks, and ii) a performance condition of the respective one of the plurality of different networks; and
   a network interface controller configured to i) receive, from the host, a selection of one of the plurality of different networks, wherein the selection is based on at least one of an indicated preference of the one of the plurality of different networks, the availabilities of the plurality of different networks, and the performance conditions of the plurality of different networks, and ii) activate one of the plurality of communications paths based on the selection.

2. The network interface of claim 1, wherein the performance condition includes at least one of a link status associated with the respective one of the plurality of different networks, a network throughput associated with the respective one of the plurality of different networks, a network traffic load associated with the respective one of the plurality of different networks, network congestion associated with the respective one of the plurality of different networks, and a received signal intensity associated with the respective one of the plurality of different networks.

3. The network interface of claim 1, wherein the availability is based on whether a link has been established with the respective one of the plurality of different networks.

4. The network interface of claim 1, wherein the physical layer device is configured to determine the availability based on whether the physical layer device has detected a beacon signal transmitted from the respective one of the plurality of different networks.

5. The network interface of claim 1, wherein the network interface controller is configured to communicate the at least one of the availabilities and the conditions to the host.

6. The network interface of claim 1, wherein the indicated preference is based on at least one of a user selected preference, a default preference, and an ordered plurality of preferred networks.

7. The network interface of claim 1, wherein the network interface controller is configured to set, in a control register, a bit corresponding to a selected one of the plurality of communication paths.

8. The network interface of claim 1, further comprising:
   read only memory configured to store the media access controller address, wherein the network interface controller is configured to i) retrieve the media access controller address from the read only memory, and ii) load the media access controller address into the media access controller.

9. A method of operating a network interface, the comprising:
   providing a plurality of communication paths between a host and a plurality of different networks, each of the plurality of communication paths including a media access controller and a physical layer device;
   using the media access controller, communicating with a respective one of the plurality of different networks using a same media access controller address;
   using the physical layer device, determining at least one of i) an availability of the respective one of the plurality of different networks, and ii) a performance condition of the respective one of the plurality of different networks;
   receiving, from the host, a selection of one of the plurality of different networks, wherein the selection is based on at least one of an indicated preference of the one of the plurality of different networks, the availabilities of the plurality of different networks, and the performance conditions of the plurality of different networks; and
   activating one of the plurality of communications paths based on the selection.

10. The method of claim 9, wherein the performance condition includes at least one of a link status associated with the respective one of the plurality of different networks, a network throughput associated with the respective one of the plurality of different networks, a network traffic load associated with the respective one of the plurality of different networks, network congestion associated with the respective one of the plurality of different networks, and a received signal intensity associated with the respective one of the plurality of different networks.

11. The method of claim 9, wherein the availability is based on whether a link has been established with the respective one of the plurality of different networks.

12. The method of claim 9, wherein determining the availability includes determining the availability based on whether the physical layer device has detected a beacon signal transmitted from the respective one of the plurality of different networks.

13. The method of claim 9, further comprising communicating the at least one of the availabilities and the conditions to the host.

14. The method of claim 9, wherein the indicated preference is based on at least one of a user selected preference, a default preference, and an ordered plurality of preferred networks.

15. The method of claim 9, further comprising setting, in a control register, a bit corresponding to a selected one of the plurality of communication paths.

16. The method of claim 9, further comprising:
- storing, in read only memory, the media access controller address;
- retrieving the media access controller address from the read only memory; and
- loading the media access controller address into the media access controller.

* * * * *